US009461427B2

(12) United States Patent
Janitch

(10) Patent No.: US 9,461,427 B2
(45) Date of Patent: Oct. 4, 2016

(54) ROTATABLE AND REMOVABLE MULTI-PIN EXPLOSION PROOF CONNECTOR ASSEMBLY

(71) Applicant: Magnetrol International, Incorporated, Aurora, IL (US)

(72) Inventor: Paul G. Janitch, Lisle, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 52 days.

(21) Appl. No.: 14/619,222

(22) Filed: Feb. 11, 2015

(65) Prior Publication Data

US 2016/0233633 A1 Aug. 11, 2016

(51) Int. Cl.
*G01D 21/00* (2006.01)
*H01R 25/00* (2006.01)
*H01R 4/30* (2006.01)

(52) U.S. Cl.
CPC ................ *H01R 25/00* (2013.01); *H01R 4/30* (2013.01)

(58) Field of Classification Search
CPC ...... G01D 11/30; G01N 17/00; G01N 1/125; G01K 113/00; G01K 1/14; H01R 31/06
USPC ................. 73/866.5, 86; 374/140, 155, 208; 439/638
See application file for complete search history.

(56) References Cited

U.S. PATENT DOCUMENTS 3,747,047 A * 7/1973 Carter ................ H01R 13/4538 439/141
8,052,484 B1 * 11/2011 Salisbury ............. H01R 13/642 439/680
2012/0035880 A1 * 2/2012 Al-Misfer ............... G01F 23/22 702/130
2014/0125512 A1 * 5/2014 Janitch .................. G01F 23/284 342/124

FOREIGN PATENT DOCUMENTS

DE 69931886 T2 11/2006
EP 0190843 A1 8/1986

OTHER PUBLICATIONS

International Search Report and Written Opinion mailed May 2, 2016 in International Application No. PCT/US16/17455.

* cited by examiner

*Primary Examiner* — Lisa Caputo
*Assistant Examiner* — Nigel Plumb
(74) *Attorney, Agent, or Firm* — Wood, Phillips, Katz, Clark & Mortimer

(57) ABSTRACT

A process measurement instrument comprises a process adaptor for mounting to a process vessel or the like and operatively associated with a sensing element for sensing a process variable and including plural electrical conductors. An instrument housing includes a control circuit. A connector assembly is operatively disposed between the instrument housing and the process adaptor for removably connecting the instrument housing to the process adaptor. The connector assembly comprises a first connector including a cylindrical connector body having an offset boss with a first multi-pin wire connector. A second connector includes a cylindrical connector housing, receiving the cylindrical connector body, having an offset bore, receiving the offset boss, and having a second multi-pin wire connector, mateable with the first wire connector, for selectively electrically connecting the control circuit to the sensing element with the offset boss and offset bore ensuring proper alignment of the first and second multi-pin wire connectors.

20 Claims, 6 Drawing Sheets

102
142
108
100
78P
78T
150
126

140
FP1
102
172
150
126
100
78P
78T
132
FP2
128

154
166
138
164
136
146
142
126
122
120
108
106
140
152
78T
160
159
156
172
132
158
162
150
148
130
134
144
104
100
110
112
128

ROTATABLE AND REMOVABLE MULTI-PIN EXPLOSION PROOF CONNECTOR ASSEMBLY

CROSS-REFERENCE TO RELATED APPLICATIONS

Not Applicable.

FEDERALLY SPONSORED RESEARCH OR DEVELOPMENT

Not Applicable.

MICROFICHE/COPYWRITE REFERENCE

Not Applicable.

FIELD OF THE INVENTION

This invention relates to process control instruments, and more particularly, to a removable and rotatable, multi-pin explosion proof connector.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to or representing sensed level.

Knowledge of level in industrial process tanks or vessels has long been required for safe and cost-effective operation of plants. Many technologies exist for making level measurements. These include magnetostrictive, capacitance, ultrasonic and microwave radar, to name a few.

One form of process instrument is of the intrusive type in which the primary element is in direct contact with the process fluid for sensing level. A magnetostrictive transmitter is an example of an intrusive type level measurement instrument. A magnetostrictive transmitter has a probe including a magnetostrictive wire maintained under tension in a tube. The probe extends into the process vessel. A magnetic float is movable proximate the probe and floats atop the fluid in the vessel. An electrical pulse is transmitted on the magnetostrictive wire. The electrical pulse interacts with the magnetic field of the float, which creates a torque on the wire to produce a torsional force on the wire, thus initiating a torsional wave that propagates along the wire at the speed of sound. This is known as the Wiedemann effect. Typically, a pickup sensor is positioned at one end of the wire to sense the torsional wave on the wire. The elapsed time is measured between the launch of the electrical pulse and the signal from the pickup sensor. The distance between the magnet and the pickup sensor is calculated from the measured elapsed time multiplied by the speed of the torsional wave, representing level.

It is often desirable to rotate the transmitter or other electronics head for ease of viewing of the display or accessing wire compartments or the like. Also, it is advantageous to have the transmitter removable for ease of installation and maintenance. In hazardous environments it is necessary that connection between the transmitter and probe satisfy requirements for explosion-proof applications.

This application is directed to improvements which allow a transmitter to be rotatable, removable and/or remote mountable.

SUMMARY

In accordance with one aspect there is disclosed a process measurement instrument comprising a process adaptor for mounting to a process vessel or the like and operatively associated with a sensing element for sensing a process variable and including plural electrical conductors. An instrument housing includes a control circuit. A connector assembly is operatively disposed between the instrument housing and the process adaptor for removably connecting the instrument housing to the process adaptor. The connector assembly comprises a first connector including a cylindrical connector body having an offset boss with a first multi-pin wire connector. A second connector includes a cylindrical connector housing, receiving the cylindrical connector body, having an offset bore, receiving the offset boss, and having a second multi-pin wire connector, mateable with the first wire connector, for selectively electrically connecting the control circuit to the sensing element with the offset boss and offset bore ensuring proper alignment of the first and second multi-pin wire connectors.

It is a feature that the cylindrical connector body comprises a one piece metal body threaded at one end, opposite the offset boss, for connection to the process adaptor or the instrument housing.

It is another feature that the cylindrical connector housing comprises a one piece metal housing. The connector housing may include a neck at one end and a cylindrical swivel secured for rotation around the neck. The swivel includes an outer thread for connection to the process adaptor or the instrument housing and enabling rotation of the control housing relative to the process adaptor. The swivel may include a pin receivable in an arcuate slot in the cylindrical connector housing to limit rotation of the cylindrical swivel. The swivel may include a set screw engaging the neck to selectively prevent rotation of the cylindrical swivel.

It is another feature that the second connector is adapted to provide a cylindrical flame path between the cylindrical swivel and the neck and the cylindrical connector body and the cylindrical connector housing are adapted to provide a second cylindrical flame path to provide an explosion-proof connector assembly.

It is another feature that the neck comprises a through opening filled with a potting compound and the cylindrical connector body includes a through opening filled with a potting compound.

It is yet another feature to provide an elongate cable including a third connector, similar to the first connector, at one end, and a fourth connector, similar to the second connector, at an opposite end. A cable is connected between the first and second connector to remotely mount the control housing relative to the process adaptor.

It is an additional feature to provide an O-ring disposed between the cylindrical connector body and a cylindrical connector housing.

It is yet another feature to provide a lock screw receivable in an opening in the cylindrical connector housing engaging the offset boss to secure the second connector to the first connector.

There is disclosed in accordance with another embodiment a process measurement instrument comprising a process adaptor for mounting to a process vessel or the like and operatively associated with a sensing element for sensing a process variable and including plural electrical conductors. An instrument housing includes a control circuit. A connector assembly is operatively disposed between the instrument housing and the process adaptor for removably connecting the instrument housing to the process adaptor. The connector assembly comprises a first connector including a cylindrical connector body with a coaxial through opening and having an offset boss at one end with a first multi-pin wire connector in the through opening at the offset boss and a first electrical cable in the through opening connected to the first multi-pin wire connector. A second connector includes a cylindrical connector housing with a coaxial through opening and a first blind bore at one end, receiving the cylindrical connector body, and an offset blind bore in the first blind bore, receiving the offset boss. A second multi-pin wire connector is in the offset blind bore and extends into the through opening. A second electrical cable in the through opening is connected to the second multi-pin wire connector. Incident to the offset blind bore receiving the offset boss, the first multi-pin wire connector is mated with the second multi-pin wire connector for selectively electrically connecting the control circuit to the sensing element with the offset boss and offset bore ensuring proper alignment to the first and second multi-pin wire connectors.

Other features and advantages will be apparent from a review of the entire specification, including the appended claims and drawings.

BRIEF DESCRIPTION OF THE DRAWINGS

FIG. 68 is a view similar to FIG. 6A showing first and second connectors of the connector assembly of FIG. 6A in spaced apart relationship;

DETAILED DESCRIPTION

Figure 1:
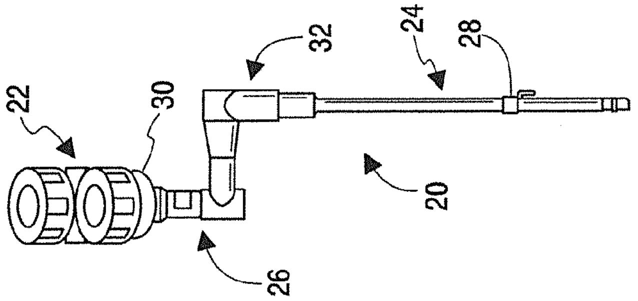
FIG. 1 is a perspective view of a process control instrument with a rotatable and removable probe shown in a first angular orientation.

Referring to FIG. 1, a magnetostrictive level sensing instrument 20 is illustrated. As is conventional, the instrument 20 is operable to sense level of a material, such as a fluid in a process vessel, and transmit an electrical signal indicative of the level to control instrumentation.

The instrument 20 includes a transmitter 22 and a probe 24 connected by a connector assembly 26. A magnetic 28 (usually part of a float) is receivable on the probe 24. The transmitter 22 includes a control housing 30. The housing 30 comprises a dual compartment instrument housing as described in Mulrooney et al. U.S. Pat. No. 6,062,905, the specification of which is incorporated by reference herein. The housing 30 houses a sensing circuit, described below, for determining level and generating an electrical signal representing level for transmission to other control instruments, as is well known. A process adaptor 32 is provided for mounting to a process vessel or the like and is operatively connected to the probe 24. The process adaptor 32 may take any known form, such as a flange or threaded connector, as is conventional. As described herein, the connector assembly 26 is operatively disposed between the instrument housing 30 and the process adaptor 32.

Figure 2:
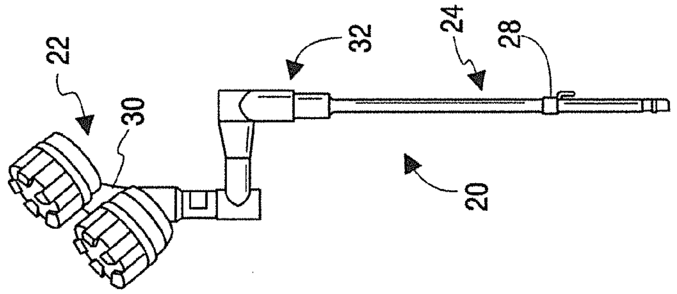
FIG. 2 is a view similar to FIG. 1, with the control head at a second angular orientation.
Figure 3:
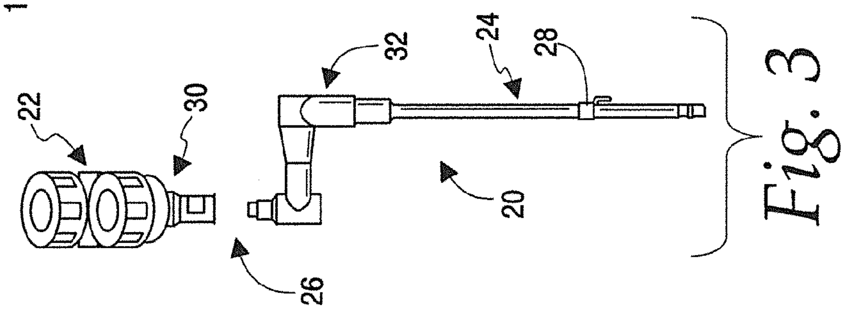
FIG. 3 is a view similar to FIG. 1 with the control head removed.
Figure 4:
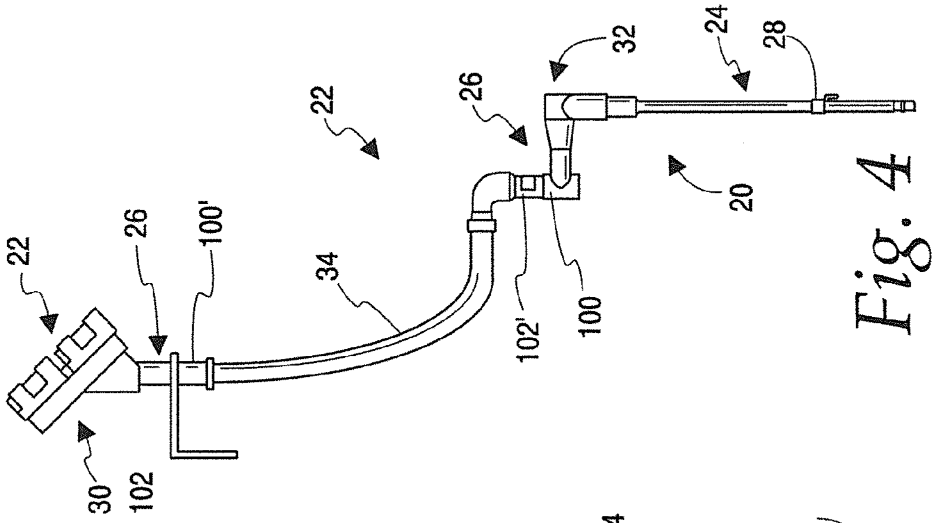
FIG. 4 is a view similar to FIG. 1 with an additional cable for remote mounting of the control head.

The connector assembly 26 is rotatable, as illustrated by comparing the orientation of the control housing 30 in FIG. 2 relative to FIG. 1. Likewise, the control housing 30 is removable, as illustrated in FIG. 3, using the connector assembly 26. Finally, a cable 34, using a connector assembly 26 at each end, as shown in FIG. 4, allows for remote mounting of the control housing 30 relative to the probe 24.

The magnet 28 comprises a conventional magnetic float, and is illustrated schematically. The magnet 28 is effectively captured on the probe 24. As is known, the magnet, in the form of a float, floats atop the material the level of which is being sensed and creates a magnetic field representative of the location of the top surface of the fluid or other material. As is apparent, the magnet 28 could be replaced by another type of magnetic device for more generally sensing position of the magnet. Thus, the sensing instrument 20 could alternatively sense position rather than level.

Figure 5:
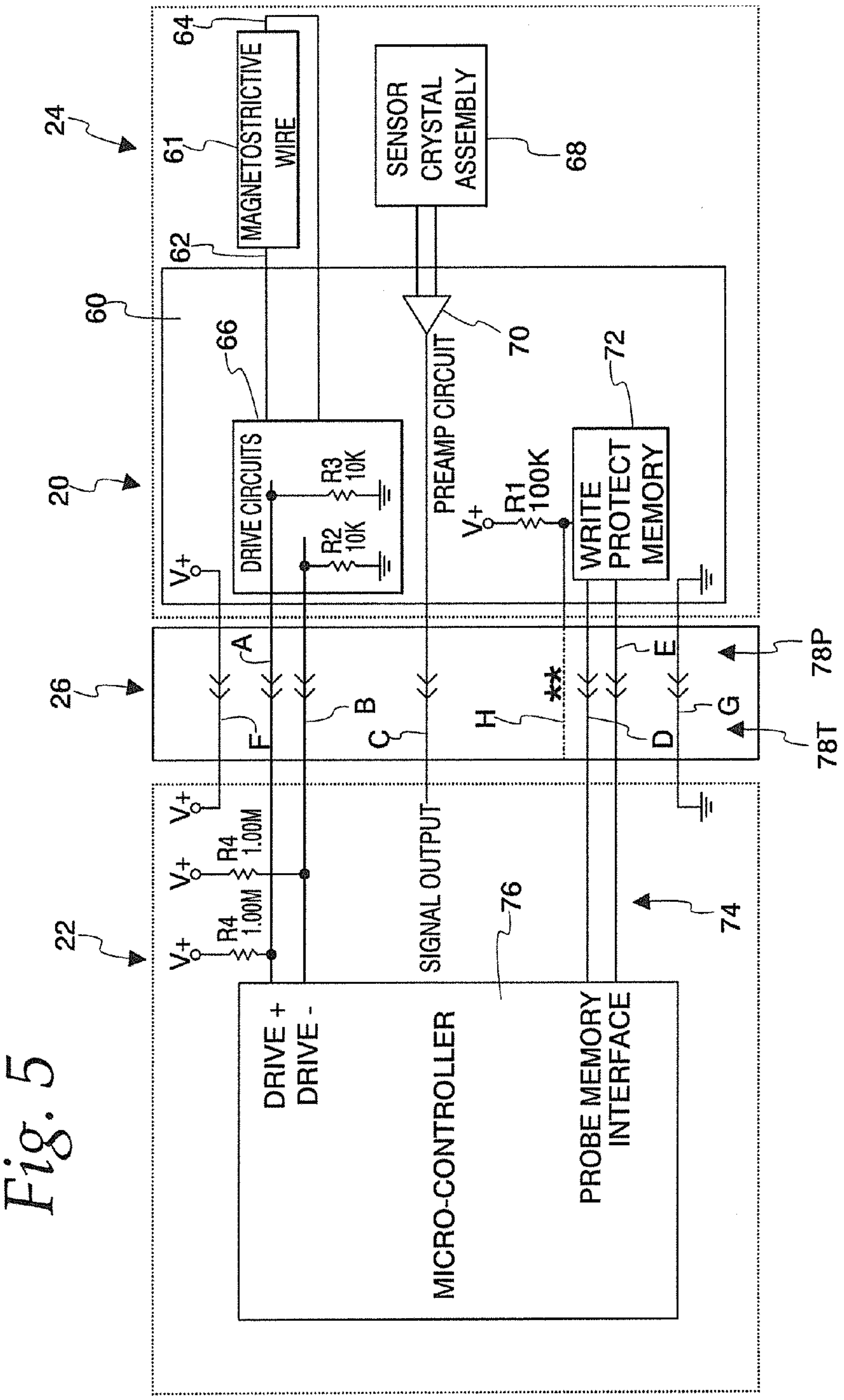
FIG. 5 is an electrical schematic of the instruments of FIG. 1.

Referring to FIG. 5, the probe 24 has a conventional magnetostrictive wire 61 having a first end 62 and a second end 64. Both ends 62 and 64 of the magnetostrictive wire 61 are connected to a drive circuit 66 of a probe circuit 60. A pickup sensor crystal assembly 68 is operatively coupled to the magnetostrictive wire 61, in any known manner. For example, the sensor crystal assembly 68 may sandwich the magnetostrictive wire 61 as shown in U.S. Pat. No. 7,466,124, owned by the Assignee of the present application, the specification of which is incorporated by reference herein.

The sensor crystal assembly 68 is electrically connected to a preamplifier circuit 70 of the probe circuit 60. The probe circuit 60 also includes a memory circuit 72. The memory circuit 72 is provided with a write protect function.

The transmitter 22 includes a control circuit 74. The control circuit 74 is connected via the connector assembly 26, as described below, to the probe circuit 60. The control circuit 74 comprises a controller in the form of a programmed microcontroller 76. The microcontroller 76 comprises a programmed processor and associated memory and I/O, such as a keypad and display (not shown), for operating in accordance with a control program to control operation of the instrument 20.

The connector assembly 26 connects a multi-conductor cable 78P from the probe 24 to a multi-conductor cable 78T from the control circuit 74. These cables 78T and 78P include eight connector lines labelled A, B, C, D, E F, G and H.

The microcontroller 76 includes DRIVE+ and DRIVE− outputs connected via connector lines A and B to the drive circuit 66. A signal output from the preamp circuit 70 is connected via the connector line C to a signal output line of the microcontroller 76. The microcontroller 76 includes probe memory interface ports connected via connector lines D and E to the memory circuit 72. Connector lines F and G are provided for plus voltage and ground, as illustrated. The swivel connector 26 illustrates a dashed line, representing a connector line H, used for a write protect input of the memory circuit 72. This line H is only used during a factory calibration function, as described below, and does not connect to the microcontroller 76.

As is conventional, the microcontroller 76 controls the drive circuit 66 to develop an electrical pulse on the magnetostrictive wire 61. A magnetic field from the float 28 produces a torsional wave on the magnetostrictive wire 61 sensed by the sensor crystal assembly 68. This wave is used by the microcontroller 76 to determine position of the float 28, or more generally, the magnet, representing level when implemented as a level measuring instrument.

The illustrated embodiment comprises a process measurement instrument in the form of a magnetostrictive instrument which can be used to sense position of a magnet. In the illustrated embodiment, the magnet would float atop material level to indicate level. However, the connector assembly described herein is not limited to a magnetostrictive type sensor or a level sensor. The connector assembly 26 could be used with other process measurement instruments including a sensing element for sensing a process variable and plural electrical conductors in a sensing element for connection to a control circuit in a separate control housing. Examples of other type devices include capacitance, guided wave radar, ultrasonic and microwave radar, to name a few. This application is not directed to the specific control technology, but rather the use of a connector assembly for connecting an instrument housing to the sensing element.

Figure 6A:
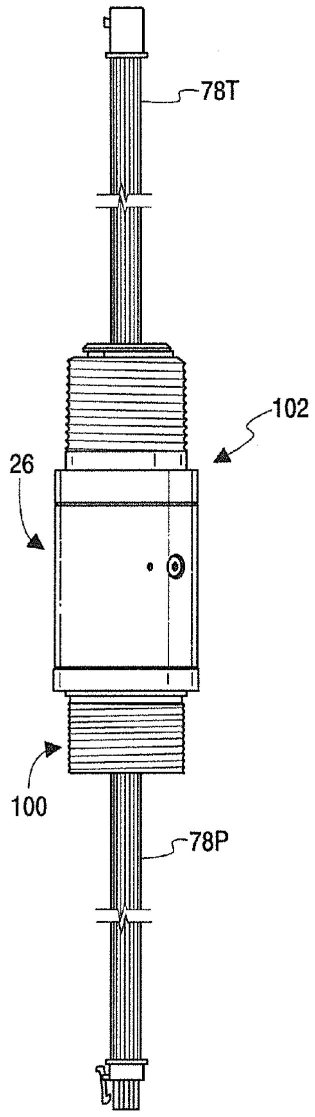
FIG. 6A is a side view of the connector assembly used with instrument of FIG. 1.
Figure 6B:
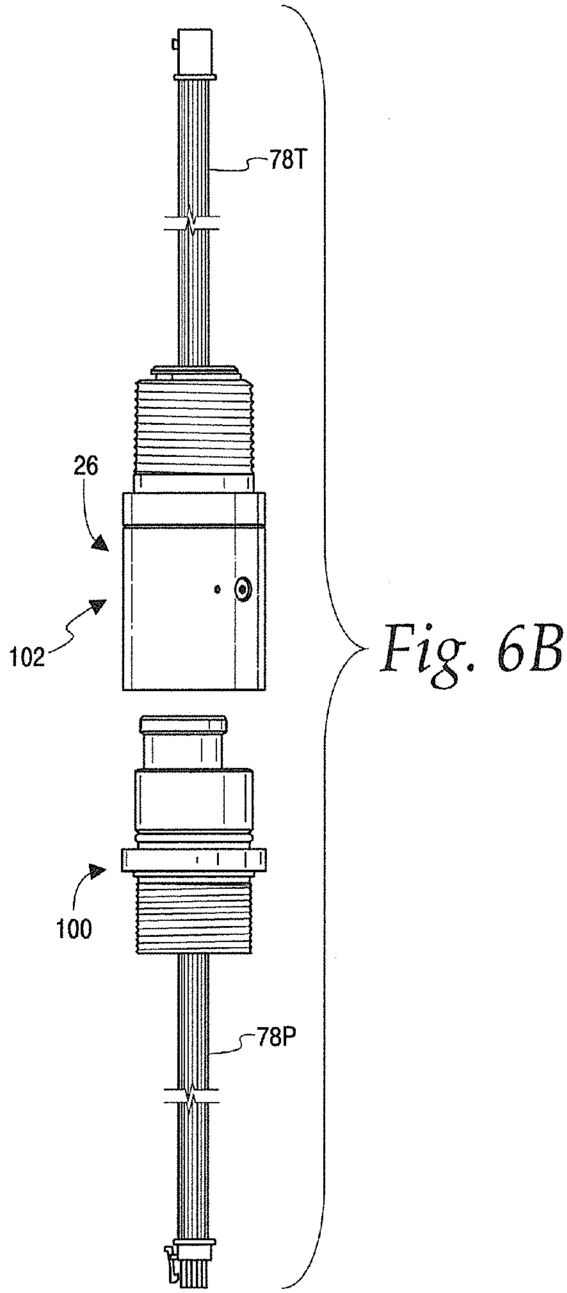

Referring to FIGS. 6A and 6B, the connector assembly 26 comprises a first connector 100 and a second connector 102. The first connector 100 includes the probe cable 78P. The second connector 102 includes the transmitter cable 78T. As is apparent, the connections could be opposite.

Figure 7A:
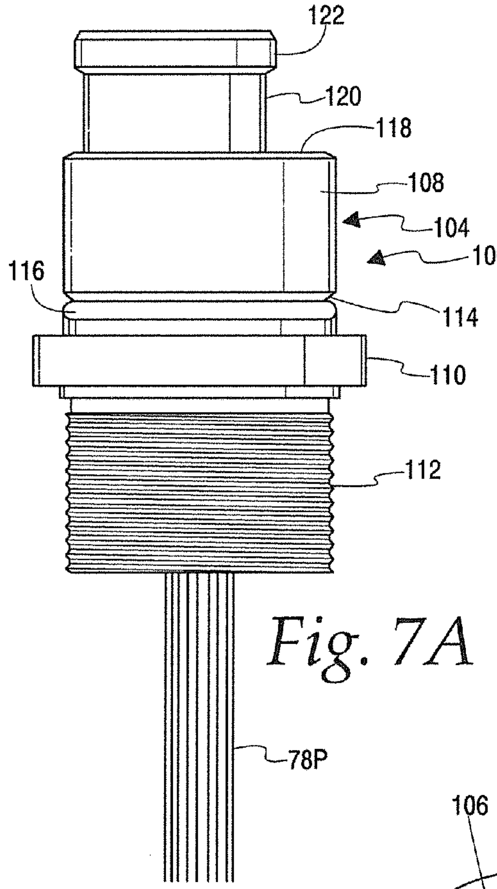
FIG. 7A is a side view of the first connector.
Figure 7B:
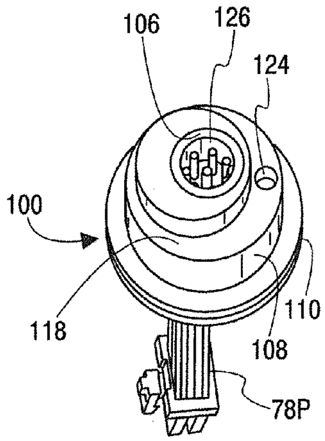
FIG. 7B is a perspective view of the first connector.
Figure 7C:
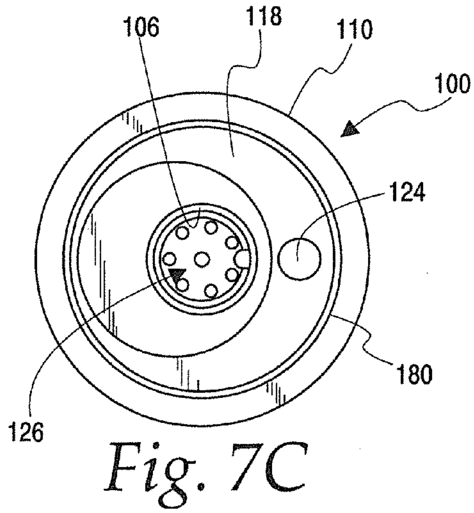
FIG. 7C is an end view of the first connector.

Referring to FIGS. 7A, 7B and 7C, the first connector 100 includes a one piece metal cylindrical connector body 104. The connector body 104 includes a coaxial through opening 106, see FIG. 9. The connector body 104 is formed to include an upper end sleeve 108 separated by a flange 110 from a threaded lower end 112. The threaded end 112 provides a mechanical connection to the process adapter 32 or the control housing 30, depending on the orientation of the connector assembly 26. An annular groove 114 in the sleeve 108 just above the flange 110 receives an O ring 116. The body 104 is narrowed above the sleeve 108 to define a shoulder 118 with an offset boss 120 extending upwardly therefrom. A distal end of the boss 120 includes an annular rim 122. A blind bore 124 is provided in the shoulder 118 in radial alignment with the through opening 106 in the widest portion of the shoulder 118.

A first multi-pin wire connector 126 is receivable in the through opening 106 and is flush mounted in the boss 120. In the illustrated embodiment, the wire connector 126 comprises a plastic body having eight pins for connection to the eight lines of the cable 78P, as will be apparent. A potting compound 128 fills the through opening 106, below the wire connector 126, see FIG. 9.

Figure 8A:
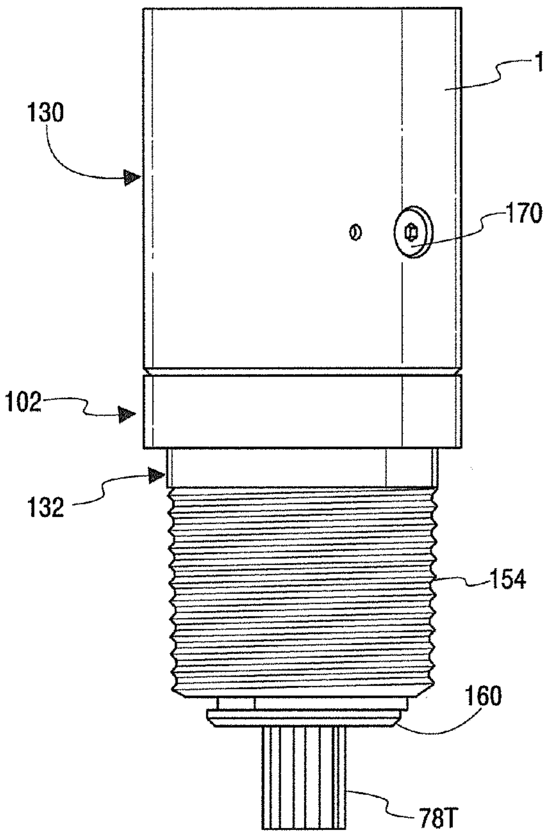
FIG. 8A is a side view of the second connector.
Figure 8B:
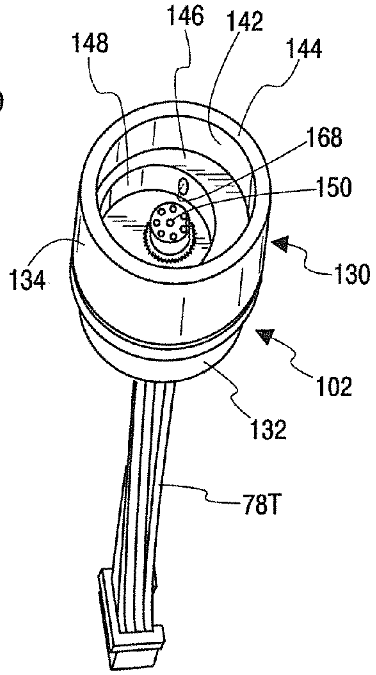
FIG. 8B is a perspective view of the second connector.
Figure 8C:
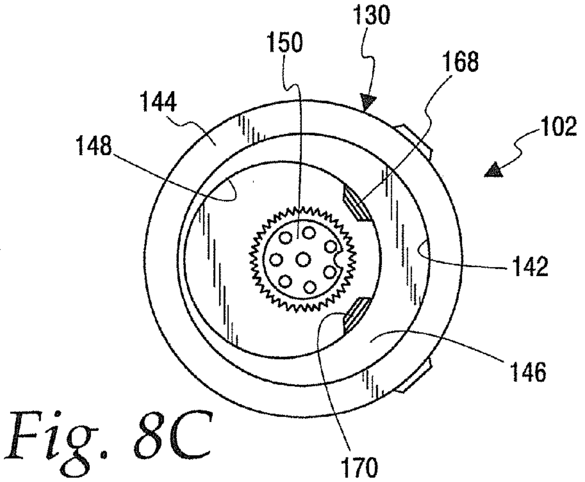
FIG. 8C is an end view of the second connector.

Referring to FIGS. 8A, 8B and 8C, the second connector 102 includes a one piece metal cylindrical connector housing 130 and a cylindrical swivel 132 rotatably mounted to the connector housing 130.

Figures 9, 10, 11:
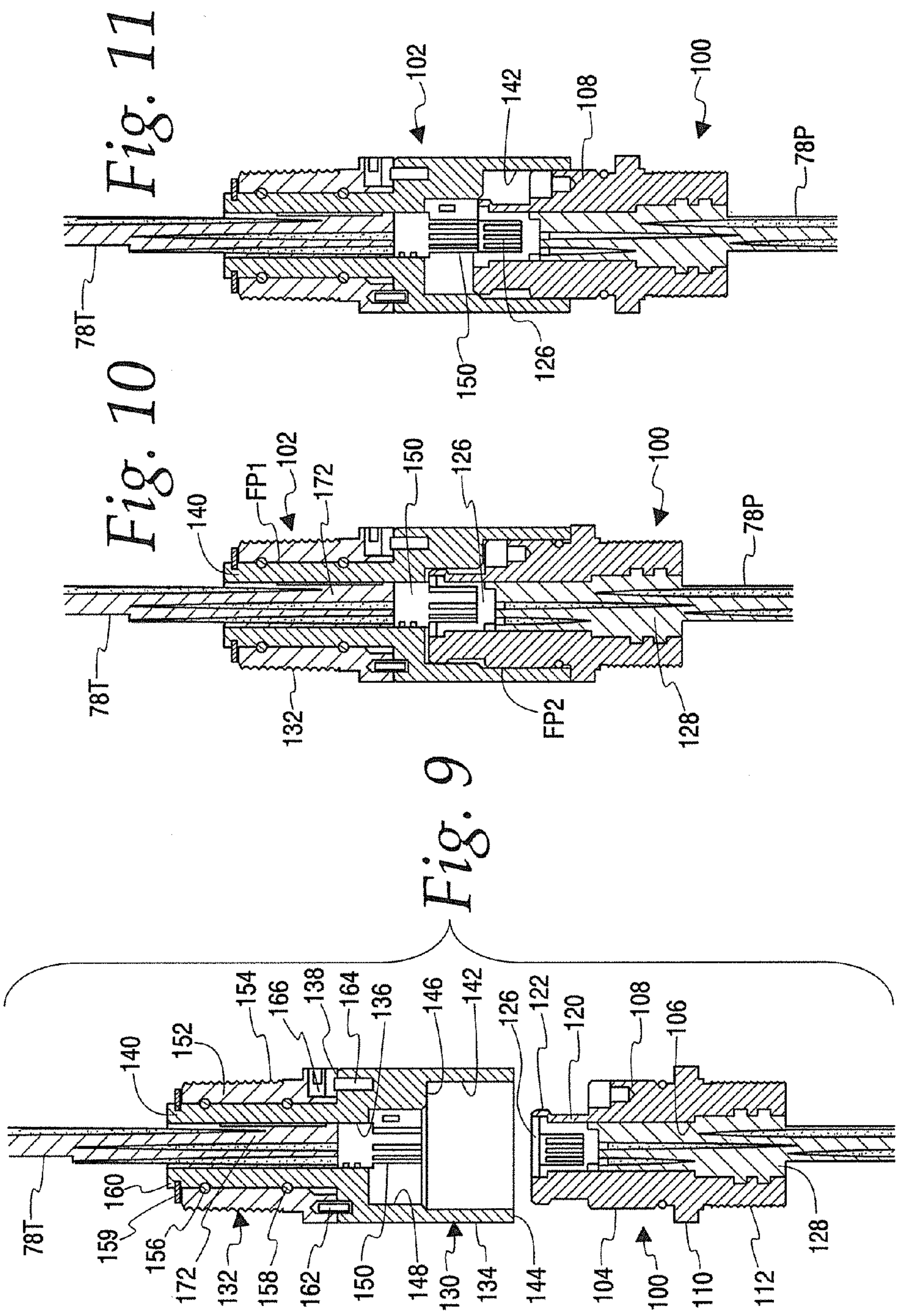
FIG. 9 is a sectional view of the connectors in spaced apart relationship.
FIG. 10 is a sectional view of the connector assembly in a connected state.
FIG. 11 is a sectional view showing the connector assembly in an intermediate position relative to those shown in FIGS. 9 and 10.

Referring also to FIG. 9, the connector housing 130 includes a cylindrical body 134 having a coaxial through opening 136. The body 134 narrows at a shoulder 138 to provide a neck 140. A first blind bore 142 is provided at a connector end 144, opposite the neck 140, and defining an interior shoulder 146. The first blind bore 142 is coaxial with the through opening 136. A second blind bore 148 in the shoulder 146 is offset from the first blind bore 142. The second blind bore 148 opens to the through opening 136. The first blind bore is of a size and shape to receive the connector body sleeve 108. The second blind bore 148 is of a size, shape and offset position to receive the offset boss 120, including the upper rim 122.

A second multi-pin wire connector 150 is partially receivable in the through opening 136 and extends into the offset blind bore 148 flush with the shoulder 146. As such, the second multi-pin wire connector 150 is coaxial with and aligned with the first multi-pin wire connector 126, as illustrated in FIG. 9. The second multi-pin wire connector 150 comprises a plastic body with eight conductive terminals for connecting to the conductors of the transmitter cable 78T. The second multi-pin wire connector 150 is mateable with the first multi-pin wire connector 126.

The swivel 132 comprises a collar 152 having an outer thread 154. The collar 152 provides a mechanical connection to the control housing 30 or the process adapter 32, depending on the orientation of the connector assembly 26. The collar 152 is receivable on the neck 140. A pair of O-rings 156 and 158 are provided therebetween. A rectangular ring 159 at a top end 160 of the neck 140 retains the swivel 132 on the neck 140. A roll pin 162 extending from the swivel 132 is receivable in an arcuate groove 164 in the housing shoulder 138 to limit rotation of the swivel 132 relative to the connector housing 130. A locking set screw 166 through the collar 152 selectively engages the neck 140 to lock the swivel in a desired position relative to the connector housing 130.

To prevent damage to the plastic wire connectors 126 and 150, the connectors 100 and 102 must be aligned before the wire connectors 126 and 150 begin to interlock during insertion. This is accomplished using the offset boss 120 in combination with the offset bore 148. The connectors 100 and 102 are illustrated disconnected in FIG. 9. As the first connector 100 is inserted into the second connector 102, as shown in FIG. 11, the sleeve 108 fits snugly within the first bore 142. However, before the wire connectors 126 and 150 mate, the first connector 100 must be rotated until the offset boss 120 is aligned with the offset bore 148 to allow further insertion. With such alignment, the wire connectors 150 and 126 are properly aligned for full insertion and connection, as illustrated in FIG. 10.

A pair of locking set screws 168 and 170 extend into the offset bore 148, see FIGS. 8B and 8C, for selectively engaging the offset boss 120, just below the rim 122, to secure the first connector 100 to the second connector 102.

As with the first connector 100, a potting compound 72 fills the second through opening 136 above the second wire connector 150. Thus, the wires 78T and 78P are encapsulated with an approved flame retardant potting compound. Also, a cylindrical flame path FP1, see FIG. 10, is provided between the swivel 132 and the neck 140. Another cylindrical flame path FP2 is provided between the first connector body 104 and a second connector housing 130.

As described herein, the transmitter 22 is selectively removable from the probe 24. This is done using the connector assembly 26 which enables the transmitter 22 to be removed from the probe 24, see FIG. 3, and to be rotated relative to the probe 24, see FIG. 2. Alternatively, the connector assembly 26 could be used with an elongate cable 34 to allow the transmitter 22 to be remotely mounted relative to the probe 24, see FIG. 4.

Particularly, the connector assembly 26 using the first connector 100 and the second connector 102 enables the control housing 30 to be removed from the process adaptor 32 and thus the probe 24 for servicing and the like. Also, the use of the swivel 132 allows the connectors 100 and 102 to be rotatable relative to one another to provide a desired orientation of the control housing 30. Moreover, a cable 34, see FIG. 4, including a third connector 100', at one end, and similar to the first connector 100, and a fourth connector 102' at an opposite end, and similar to the second connector 102, allows the control housing 30 to be mounted remotely relative to the process adaptor 32 with the same fittings as the connector assembly 26, on each end.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A process measurement instrument comprising: a process adapter for mounting to a process vessel and operatively associated with a sensing element for sensing a process variable and including plural electrical conductors;

an instrument housing including a control circuit; and a connector assembly operatively disposed between the instrument housing and the process adapter for removably connecting the instrument housing to the process adapter, the connector assembly comprising a first connector including a cylindrical connector body having an offset boss with a first multi-pin wire connector, and a second connector including a cylindrical connector housing, receiving the cylindrical connector body, having an offset bore, receiving the offset boss, having a second multi-pin wire connector, mateable with the first wire connector for selectively electrically connecting the control circuit to the sensing element with the offset boss and offset bore ensuring proper alignment of the first and second multi-pin wire connectors.

2. The process measurement instrument of claim 1 wherein the cylindrical connector body comprises a one piece metal body threaded at one end, opposite the offset boss, for connection to the process adapter or the instrument housing.

3. The process measurement instrument of claim 1 wherein the cylindrical connector housing comprises a one piece metal housing.

4. The process measurement instrument of claim 3 wherein the connector housing includes a neck at one end and a cylindrical swivel secured for rotation around the neck, the swivel including an outer thread for connection to the process adapter or the instrument housing and enabling rotation of the control housing relative to the process adapter.

5. The process measurement instrument of claim 4 wherein the swivel includes a pin receivable in an arcuate slot in the cylindrical connector housing to limit rotation of the cylindrical swivel.

6. The process measurement instrument of claim 4 wherein the swivel includes a set screw engaging the neck to selectively prevent rotation of the cylindrical swivel.

7. The process measurement instrument of claim 4 wherein the second connector is adapted to provide a cylindrical flame path between the cylindrical swivel and the neck and the cylindrical connector body and the cylindrical connector housing are adapted to provide a second cylindrical flame path to provide an explosion proof connector assembly.

8. The process measurement instrument of claim 7 wherein the neck comprises a through opening filled with a potting compound and the cylindrical connector body includes a through opening filled with a potting compound.

9. The process measurement instrument of claim 1 further comprising an elongate cable including a third connector, similar to the first connector, at one end, and a fourth connector, similar to the second connector, at an opposite end, for connecting the cable between the first and second connectors to remotely mount the control housing relative to the process adapter.

10. The process measurement instrument of claim 1 further comprising an o-ring disposed between the cylindrical connector body and the cylindrical connector housing.

11. The process measurement instrument of claim 1 further comprising a lock screw receivable in an opening in the cylindrical connector housing engaging the offset boss to secure the second connector to the first connector.

12. A process measurement instrument comprising: a process adapter for mounting to a process vessel and operatively associated with a sensing element for sensing a process variable and including plural electrical conductors;

an instrument housing including a control circuit; and a connector assembly operatively disposed between the instrument housing and the process adapter for removably connecting the instrument housing to the process adapter, the connector assembly comprising a first connector including a cylindrical connector body with a coaxial through opening and having an offset boss at one end with a first multi-pin wire connector in the through opening at the offset boss and a first electrical cable in the through opening connected to the first multi-pin wire connector, and a second connector including a cylindrical connector housing with a coaxial through opening and a first blind bore at one end, receiving the cylindrical connector body, and an offset blind bore in the first blind bore, receiving the offset boss, a second multi-pin wire connector in the offset blind bore and extending into the through opening and a second electrical cable in the through opening connected to the second multi-pin wire connector, wherein incident to the offset blind bore receiving the offset boss the first multi-pin wire connector is mated with the second wire multi-pin connector for selectively electrically connecting the control circuit to the sensing element with the offset boss and offset bore ensuring proper alignment of the first and second multi-pin wire connectors.

13. The process measurement instrument of claim 12 wherein the connector housing includes a neck at one end and a cylindrical swivel secured for rotation around the neck, the swivel including an outer thread for connection to the process adapter or the instrument housing and enabling rotation of the control housing relative to the process adapter.

14. The process measurement instrument of claim 13 wherein the swivel includes a pin receivable in an arcuate slot in the cylindrical connector housing to limit rotation of the cylindrical swivel.

15. The process measurement instrument of claim 13 wherein the swivel includes a set screw engaging the neck to selectively prevent rotation of the cylindrical swivel.

16. The process measurement instrument of claim 13 wherein the second connector is adapted to provide a cylindrical flame path between the cylindrical swivel and the neck and the cylindrical connector body and the cylindrical connector housing are adapted to provide a second cylindrical flame path to provide an explosion proof connector assembly.

17. The process measurement instrument of claim 16 wherein the neck comprises a through opening filled with a potting compound and the cylindrical connector body includes a through opening filled with a potting compound.

18. The process measurement instrument of claim 12 further comprising an elongate cable including a third connector, similar to the first connector, at one end, and a fourth connector, similar to the second connector, at an opposite end, for connecting the cable between the first and second connectors to remotely mount the control housing relative to the process adapter.

19. The process measurement instrument of claim 12 further comprising an o-ring disposed between the cylindrical connector body and the cylindrical connector housing.

20. The process measurement instrument of claim 12 further comprising a lock screw receivable in an opening in the cylindrical connector housing engaging the offset boss to secure the second connector to the first connector.

* * * * *